July 20, 1965  J. VAN SICKLE  3,195,946
NIGHT DRIVING GLARE SHIELD
Filed April 30, 1964
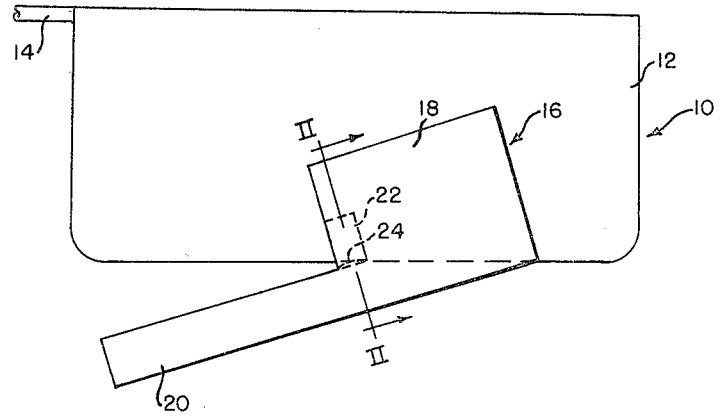
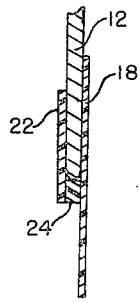
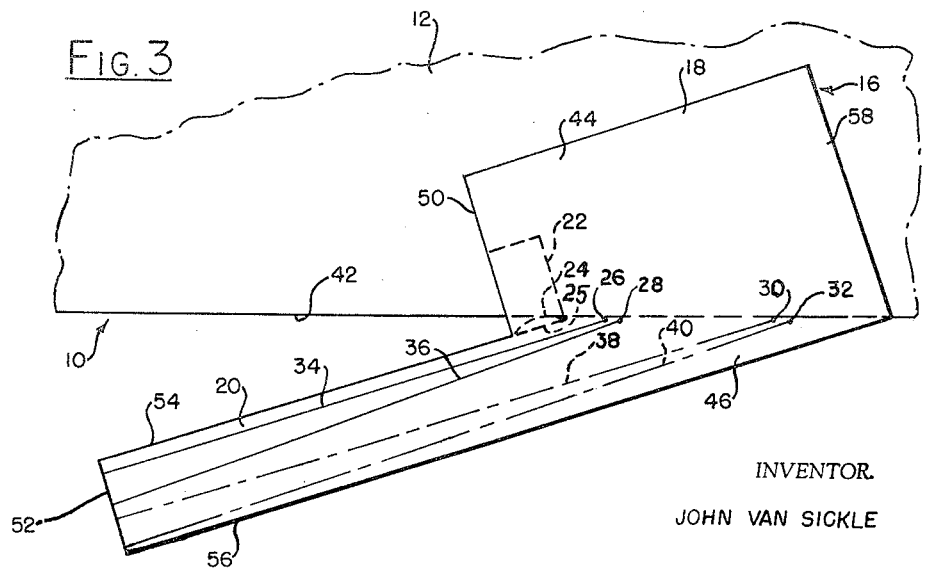
INVENTOR.
JOHN VAN SICKLE ID
3,195,946
NIGHT DRIVING GLARE SHIELD
John Van Sickle, Elma, N.Y.
(Billington Road, East Aurora, N.Y.)
Filed Apr. 30, 1964, Ser. No. 363,710
5 Claims. (Cl. 296—97)

This invention relates in general to automotive accessories and pertains, more particularly, to a glare shield attachment adapted for use in conjunction with night driving.

This application is a continuation in part of application Serial No. 201,871, filed June 12, 1962, and now abandoned.

The glare produced by the headlights of oncoming traffic creates a substantial safety hazard in connection with the operation of an automobile inasmuch as the human eye accommodates itself to light conditions much more quickly than the eye will accommodate or adapt to conditions of darkness. Thus, when a driver is subjected to glare from any source, contraction of the pupil takes place relatively rapidly whereas as soon as the glare source is eliminated, the dilation of the pupil takes a substantially longer period of time. Thus, the driver's vision will be impaired not only during the presence of the glare source, but also for a substantial period of time thereafter, creating a definite safety hazard. In order to overcome this, various types of glare shields for night driving have been proposed. However, in connection with such devices, it is imperative that the device display two characteristics simultaneously, one, that the source of glare is effectively and efficiently eliminated and, second, that the device does not detract from normal forward vision. It is the primary concern of the present invention to provide a night driving glare shield which possesses these characteristics.

An object of this invention is to provide an improved type of glare shield particularly adapted for shielding the driver's eyes from the glare of oncoming headlights which is so constructed and arranged as to be usable in combination with an ordinary sun visor to effectively obviate glare as aforesaid while, at the same time, permitting unobstructed and free forward vision so as to constitute no safety hazard in this respect.

Other objects and advantages of the invention will appear from the description hereinbelow and the accompanying drawing wherein:

FIG. 1 is an elevational view showing the glare shield attachment of the present invention as applied to an ordinary sun visor;

FIG. 2 is an enlarged vertical section taken substantially along the plane of section line II—II in FIG. 1 and showing the manner in which the attachment is secured to the sun visor; and FIG. 3 is an enlarged view illustrating the manner in which the glare attenuating effect is produced in accordance with the present invention.

Referring at this time more particularly to FIG. 1, the reference numeral 10 therein indicates in general an ordinary or conventional sun visor such as is normally employed and provided in conjunction with automotive vehicles. As is conventional in such constructions, the main body 12 of the sun visor 10 is provided with a mounting member 14 by means of which the sun visor is pivotally attached to the interior of the vehicle for movement between an out-of-the-way position and a substantially vertically depending position for the ordinary and well known usage. The glare shield attachment according to the present invention is indicated generally by the reference character 16 in FIG. 1 and will be seen to include a base portion 18 and a laterally extending blade or wing portion 20. The glare shield 16 is preferably constructed of dark, clear plastic material and may conveniently be constructed from sheet stock. A suitable clasp or clip device is utilized to attach the glare shield 16 to the main body portion 12 of the sun visor 10 and a preferred form of such clasp construction is shown in FIG. 2. In this figure, a strip 22 of material, preferably flexible plastic which may be of the same stock from which the glare shield 16 is formed, is fixed at one end to a spacer block 24 so that the strip 22 is spaced from the opposing surface of the base portion 18 by an amount which is slightly less than the normal thickness of the sun visor body 12. Thus, a frictional clamping engagement is achieved by clamping the accessory 16 to the sun visor 10 substantially as is shown in FIG. 2.

The clip assembly, as aforesaid, is disposed adjacent the base of the blade portion 20 of the glare shield and it is preferred that the mass of the base portion 18 and the blade portion 20 be such, in conjunction with the placement of the clip 22, that the clip acts substantially at the center of gravity of the glare shield device so that the angular disposition between the blade portion 20 and the bottom edge of the sun visor can be adjusted to suit the requirements of a particular situation and remain in such angularly adjusted position without shifting or changing as might be caused by vibration or jarring were the clip attachment to be located remotely from the center of gravity of the mass of the shield device 16.

FIG. 3 illustrates the manner in which the present invention operates. In this figure, reference character 26 indicates the right headlight of an oncoming vehicle as may be first observed by the left eye of the driver utilizing the shield device and the reference character 28 indicates the left headlight of the oncoming vehicle as may be first observed by the driver's left eye. On the other hand, the reference character 30 indicates the right headlight as may be first observed by the right eye of the driver whereas the reference character 32 indicates the left headlight of the oncoming vehicle as may be first observed by the right eye of the driver. The two lines 34 and 36 indicate the paths of the headlights 26 and 28 as observed by the left eye of the driver whereas the dashed lines 38 and 40 indicate the paths of the headlights 30 and 32 as seen by the right eye of the driver. Since the oncoming vehicle will be at a substantial distance when first observed, the spacing between the points 26 and 30 or the points 28 and 32 will be substantially coincidental with the interpupillary spacing of the driver, it being noted that the average interpupillary spacing is about 65 mm. The paths 34, 36, 38 and 40 are illustrative of paths which would be encountered in a two-lane highway and it has been found that the blade portion 20 must be disposed at its maximum angle with relation to the bottom edge 42 of the sun visor 10 under such conditions. For example, the angularity shown particularly in FIG. 3 is approximately 18° whereas on a thruway or like road construction, having a center mall, the angularity might be reduced to as little as approximately 3 to 5 degrees. That is, the greater the space separating the opposing traffic lane from that of the operator, the less is the required angle of the shield in relation to the bottom of the visor.

From a study of FIG. 3, it will be apparent that the base portion 18 of the glare shield device 16 includes the upper portion 44 which is disposed in face-to-face contact with the main body portion 12 of the sun visor and that such base portion 18 includes also a lower portion 46 which extends below the lower edge 42 of the sun visor. In conformity with the aforesaid requirements of effectively eliminating the glare source while, at the same time, permitting sufficient forward vision so as to preclude safety hazard stemming from the presence of the glare shield, it has been found that the horizontal width of the base portion 18, below the sun visor 10 as between the edges 50 and 58 in FIG. 3, should be at least as great as the interpupillary spacing as aforesaid. That is to say, the lower portion 46 of the base portion 18 must be of a horizontal width such that the extreme points 26 and 32, as shown in FIG. 3, are encompassed thereby. From a practical consideration, the horizontal width of the base portion 18 should not be less than about 80 mm. and may safely be made as great as about 120 mm. Within this range, adequate antiglare effect will be achieved without running the danger of blocking off normal vision for safe driving. Furthermore, it has been found that the blade portion 20 should be of a length not less than about 100 mm. in order to permit the oncoming vehicle to draw sufficiently abreast of the vehicle utilizing the glare shield attachment to substantially eliminate the danger of glare when the oncoming vehicle passes beyond the range of the blade 20. In this respect, it will be noted that the headlights of the oncoming vehicle cast their beams substantially in forwardly confined fashion so that when the oncoming vehicle approaches an abreast relationship, the glare source is largely eliminated. Preferably, the length of the blade 20 is in the order of 120 mm., this dimension being measured between the edge portion 50 of the main body portion 18 and the tip edge 52 of the blade 20. Likewise, it has been found that the width of the blade portion 20, that is the distance between the upper edge 54 and the lower edge 56 thereof, need not be greater than about 50 mm. and, is preferably 30 mm., the latter figure giving adequate protection under all circumstances encountered in driving. It will be appreciated that if the horizontal width of the blade portion 20 is too great, the glare shield attachment will detract from normal driving vision and will thereby present a safety hazard.

It is also preferred that the edge 58 of the main body portion 18 of the glare shield device 16 be straight and substantially at right angles to the blade 20, substantially as is shown, so that the attachment can be utilized, as desired by the operator, as a convenient ice or snow scraping device. It will be further noted that the presence of the clip device 22 and the associated block 24 provides an abutment assembly whereby the block 24 may be engaged against the lower edge 42 of the sun visor to thereby quickly, efficiently and conveniently locate the glare shield attachment 16 relative to the main body portion 12 of the sun visor. All that is required of the operator is to laterally adjust the glare shield device so that the glare sources are intercepted in the fashion indicated in FIG. 3 and to achieve that degree of angularity of the blade 20 which suits the driving conditions at hand. Thus, the device presents a minimum distraction from normal driving duties and activities. From FIG. 3, it will be noted that the upper edge of the abutment block 24 is arcuate to permit the angularity of the device to be adjusted by "rocking" motion. Also, it is preferred that the lower edge 25 of the abutment block be constructed to form an extension of the upper edge 54 of the blade portion so that the observer's eyes are not subjected to fatigue by distracting images of the abutment block which might otherwise lie in or close to a path of the oncoming headlights as seen by the left eye of the observer. Such a distraction would tend to cause the observer's eyes to involuntarily change focus, momentarily, to the glare shield rather than on distant objects. Similarly, I have found that a generally rectilinear shape for that portion of the glare shield which projects below the sun visor aids in preventing distractions which might otherwise occur due to the fact that the images of the glare shield as seen by the right and left eyes of the observer are shifted relative to each other into overlapping relation. This shifting and overlapping causes each edge of that area of the glare shield which is below the sun visor to be seen in two positions. If, now, the exposed edges of the glare shield are not substantially straight and parallel to each other (as are the edges 54 and 56) the doubled images of these edges tends to be distracting and to cause the aforesaid involuntary focusing upon the glare shield instead of on the road ahead. Thus, because the edges 54 and 56 are the predominant edges defining the exposed portion of the glare shield, I have found that by forming them straight and parallel, eye fatigue does not arise from this source.

Since the paths of the headlights of oncoming traffic are above or to the left of the normal field of forward vision required for safe operation of a vehicle, the shield may be positioned and used so as to effectively eliminate the glare source of oncoming traffic, without obstructing the forward vision of the road required for safe operation of the vehicle, thus creating no safety hazard. The space between the upper edge 54 of the blade portion 20 and the bottom edge 42 of the visor presents an additional area of clear vision. By looking through the shield itself, a complete range of forward vision is obtained, without the hazard created by the glare of oncoming headlights. During the intervals when no cars are approaching the driver may eliminate the shield from his path of vision by a slight nod or lowering of the head, a slight movement of the head to the right, or by a forward and upward turning of the bottom of the sun visor, or a combination of the above. A reversal of the movement would put the shield back in operative position when needed.

It is to be understood that certain changes and modifications to the specific embodiment as illustrated and described may be made without departing from the spirit of the invention or the scope of the following claims.

I claim:

1. In combination with an automobile sun visor having an opaque main body portion disposed substantially vertically and provided with a substantially horizontal lower edge, a device for shielding a driver's eyes from headlight glare of oncoming traffic, said device comprising a sheet of glare-reducing material attached to said sun visor and forming an extension of said sun visor parallel therewith and projecting below said lower edge thereof, said sheet including a base having an upper portion engaged in face-to-face contact with said main body portion of the sun visor and a lower portion projecting below said lower edge of the sun visor, and a blade portion projecting laterally from one edge of said lower portion of said base below said lower edge of the sun visor, and attachment means on said base adjacent the juncture thereof with said blade portion, said attachment means including an abutment member engaging said lower edge of the sun visor to position said lower portion and said base portion as aforesaid.

2. The combination as defined in claim 1 wherein said blade portion is of a width less than about 50 millimeters.

3. In combination with a sun visor including a body portion having a lower, generally horizontal edge, a light-attenuating glare shield having a base portion and a blade portion, and attachment means on said base portion for securing said glare shield to said sun visor, said base portion including an upper part overlapping said sun visor and a lower part extending below said lower edge of the sun visor, and said blade portion extending laterally from one edge of said lower part of the base portion in coplanar relation therewith below said lower edge of said sun visor, said lower part of the base portion being of a horizontal width, below said lower edge of the sun visor, of more than about 55 millimeters so that a distant glare source may be attenuated by said lower part of the base portion with respect to both eyes of an observer, said lower part of the base portion together with said blade portion providing a light-attenuating band which is vertically wider than the area delineated by the separate and spaced paths traced by an oncoming glare source as seen respectively by the left and right eyes of an observer and does not exceed about 50 millimeters, said blade portion of the shield extending laterally from said lower part of the base portion a distance sufficient to effect the stated attenuation of the glare source until the glare source is substantially abreast of the observer.

4. In combination with a sun visor including a body portion having a lower, generally horizontal edge, a light-attenuating glare shield having a base portion and a blade portion, said base portion including an upper part overlapping said sun visor and a lower part extending below said lower edge of the sun visor, and said blade portion extending laterally from one edge of said lower part of the base portion in coplanar relation therewith below said lower edge of said sun visor, said lower part of the base portion being of a horizontal width, below said lower edge of the sun visor, of more than about 55 millimeters so that a distant glare source may be attenuated by said lower part of the base portion with respect to both eyes of an observer, said lower part of the base portion together with said blade portion providing a light-attenuating band which is vertically wider than the area delineated by the separate and spaced paths traced by an oncoming glare source as seen respectively by the left and right eyes of an observer and does not exceed about 50 millimeters.

said blade portion of the shield extending laterally from said lower part of the base portion a distance sufficient to effect the stated attenuation of the glare source until the glare source is substantially abreast of the observer, and attachment means on said base adjacent the juncture thereof with said blade portion, said attachment means including an abutment member engaging said lower edge of the sun visor to position said lower portion and said base portion as aforesaid.

5. The combination as defined in claim 4 wherein the lower edge of said abutment member of said attachment means is aligned with the upper edge of said blade portion.

References Cited by the Examiner

UNITED STATES PATENTS 2,824,763  2/58   Extrom _____ 296—97
2,863,697  12/58  Watkins _____ 296—97

FOREIGN PATENTS 820,385  11/51  Germany.

BENJAMIN HERSH, *Primary Examiner.*

A. HARRY LEVY, *Examiner.*